US012693427B2

(12) United States Patent
Lee et al.

(10) Patent No.: US 12,693,427 B2
(45) Date of Patent: Jul. 28, 2026

(54) SYSTEM AND METHOD FOR SUPPORTING RETURN HOME MODE OF DRONE USED ON SHIP

(71) Applicant: KOREA INSTITUTE OF OCEAN SCIENCE & TECHNOLOGY, Busan (KR)

(72) Inventors: Moonjin Lee, Daejeon (KR); Tae Sung Kim, Daejeon (KR); Yong Myung Kim, Daejeon (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 46 days.

(21) Appl. No.: 18/798,003

(22) Filed: Aug. 8, 2024

(65) Prior Publication Data

US 2025/0138196 A1 May 1, 2025

(30) Foreign Application Priority Data

Nov. 1, 2023 (KR) ........................ 10-2023-0149173

(51) Int. Cl.
*G01S 19/15* (2010.01)
*B64U 20/80* (2023.01)

(52) U.S. Cl.
CPC .............. *G01S 19/15* (2013.01); *B64U 20/80* (2023.01); *B64U 2201/104* (2023.01)

(58) Field of Classification Search
CPC ... G01S 19/15; B64U 20/80; B64U 2201/104; G05D 1/661; G05D 1/248; G05D 2107/27; G05D 2109/20

USPC .......................................................... 701/17
See application file for complete search history.

(56) References Cited

U.S. PATENT DOCUMENTS

2022/0051572 A1* 2/2022 Harring ................... G05D 1/46

FOREIGN PATENT DOCUMENTS

| JP | 2020138681 A | 9/2020 | |
|----|----|----|----|
| JP | 2021181272 A | 11/2021 | |
| KR | 1020190141388 A | 12/2019 | |
| KR | 102192411 B1 | 12/2020 | |
| KR | 102379326 B1 | 3/2022 | |
| KR | 1020230080869 A | 6/2023 | |
| WO | WO-2021029498 A1 * | 2/2021 | ............. B64D 45/08 |

* cited by examiner

*Primary Examiner* — Maceeh Anwari
(74) *Attorney, Agent, or Firm* — Dinsmore & Shohl LLP; Yongsok Choi, Esq.

(57) ABSTRACT

Provided are a system and method for supporting a return home mode of a drone used on a ship. A drone control device receives GPS reception signal strength information at a first GPS receiver, drone takeoff feasibility information is displayed on a display unit of the drone control device if the GPS reception signal strength is greater than or equal to a set strength, a drone drive motor is controlled by generating a drone drive motor control signal based on ship position information received from the drone control device and drone position information received from a second GPS receiver when a control unit installed in the drone receives return home information from the drone control device after the drone takes off, and the control unit stops the drone drive motor when the difference between the drone position and the ship position is less than or equal to a set distance.

5 Claims, 2 Drawing Sheets

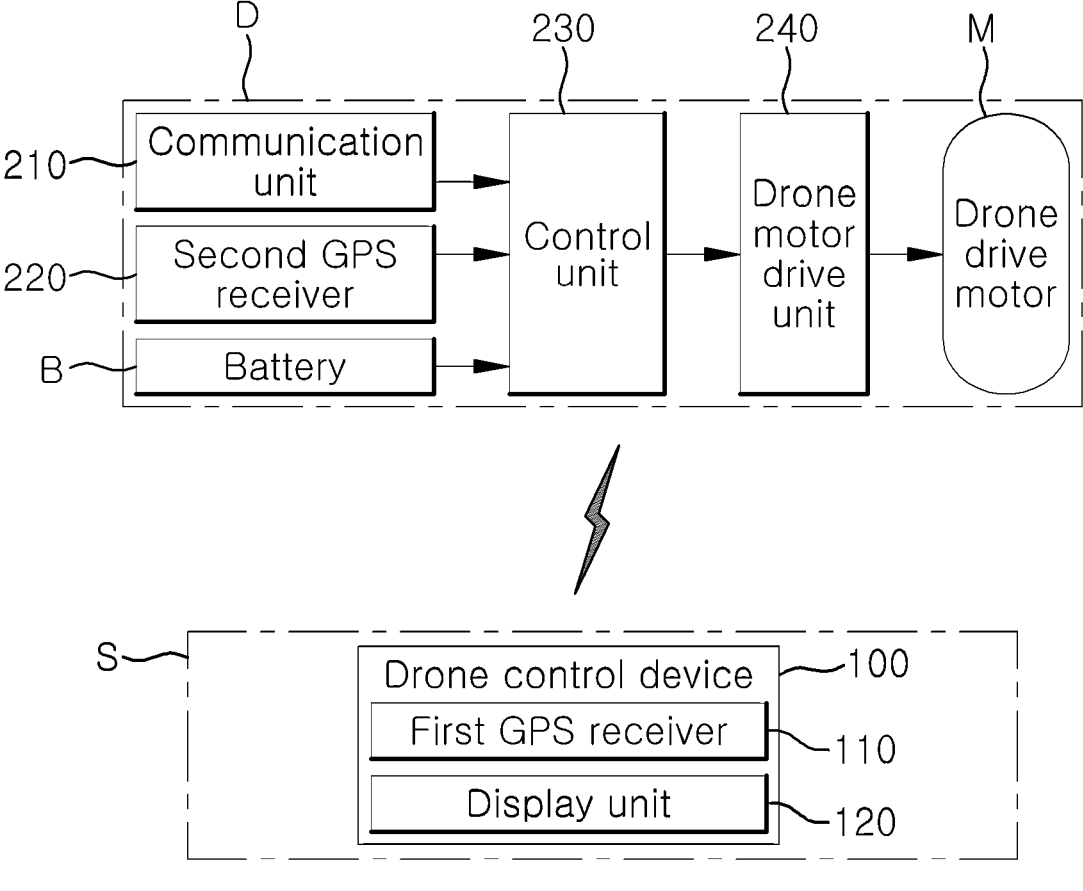
[FIG. 1]

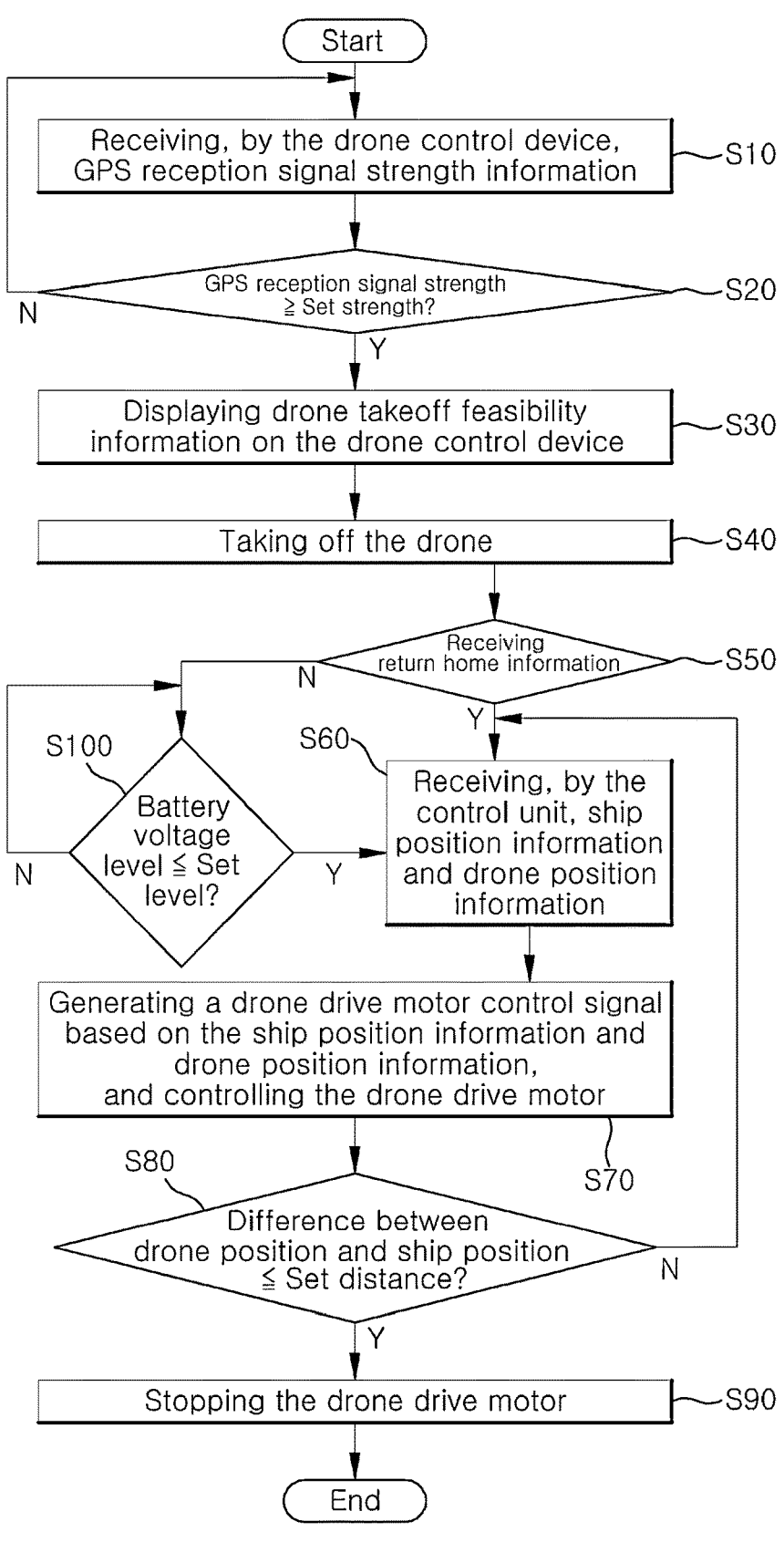
[FIG. 2]

SYSTEM AND METHOD FOR SUPPORTING RETURN HOME MODE OF DRONE USED ON SHIP

CROSS REFERENCE TO RELATED APPLICATION

The present application claims priority to Korean Patent Application No. 10-2023-0149173, filed Nov. 1, 2023, the entire contents of which are incorporated herein for all purposes by this reference.

BACKGROUND

Technical Field

The present disclosure relates to a system and method for supporting a return home mode of a drone used on a ship, and more particularly, to a system and method for supporting a return home mode of a drone used on a ship that can accurately return the drone to the charging station of a corresponding ship regardless of the operation of the ship when a return home mode command is issued to the drone or the battery voltage level of the drone falls less than or equal to a set level in a state of performing work after taking off the drone from the ship operating at sea.

Description of Related Technology

In general, drones are unmanned aircraft that can be controlled by radio waves, are equipped with cameras, sensors, communication systems, and the like, and can vary in size and weight, ranging from 25 g to 1,200 kg. Drones were first created for military purposes, but have recently expanded to high-altitude photography, delivery, etc. In addition, drones have been reborn as inexpensive kidult products, ushering in an era where individuals can purchase drones without burden. They are used in various fields, such as spraying pesticides and measuring air quality.

Among the operational modes of drones, there is a return home or auto return mode that is a function of returning to the initial takeoff position. Since the maximum cost operating time of a drone is typically only about 30 minutes to an hour, there is a problem that the drone needs to be returned to a position on the ground where the charging device is located in order to recharge the battery of the drone.

To address this problem, Korean Patent No. 1700396 (hereinafter referred to as the prior art) discloses "Drone, Charging Station, and System for Checking Violation of Law." This "Drone, Charging Station, and System for Checking Violation of Law" presents measures to crack down on violations of various laws and regulations, identify the occurrence of emergency situations, or the like through drones without restrictions on place and time by installing drone charging stations that support the charging of drones in various street facilities, law enforcement vehicles, or the like, and recharging drones with short flight times frequently as needed in cracking down on illegal activities that disrupt public order, vehicles that violate traffic laws, or the like, identifying the occurrence of emergency situations, etc., through unmanned aerial drones flying in the air.

Although such conventional technology was effective if the charging station to which the drone would return was fixed and did not move, there was a problem that the drone could fall into the sea due to the movement of a ship when returning if the charging station was disposed on the ship operating at sea.

PRIOR ART LITERATURE

Patent Document

Korean Patent No. 1700396 (Title: Drone, Charging Station, and System for Checking Violation of Law)

SUMMARY

Therefore, the present disclosure has been designed to solve the problems as described above, and it is an object of the present disclosure to provide a system and method for supporting a return home mode of a drone used on a ship that can accurately return the drone to the charging station of an operating ship regardless of the movement of the ship.

To achieve the above object, a system for supporting a return home mode of a drone used on a ship in accordance with an embodiment of the present disclosure is a system for supporting a return home mode of a drone used on a ship, in which a drone control device disposed on an operating ship returns a drone to a charging station of the ship while communicating wirelessly with the drone, wherein the drone control device is configured to display drone takeoff feasibility information on a display unit if a GPS signal strength received by a first GPS receiver built therein is greater than or equal to a set strength and to provide return home information and ship position information to the drone after the drone takes off, and the system for supporting a return home mode of a drone used on a ship is characterized by including a second GPS receiver installed in the drone and configured to generate drone position information by receiving GPS signals from GPS satellites, and a control unit installed in the drone and configured to control a drone drive motor by generating a drone drive motor control signal based on the ship position information and the drone position information when the return home information is received from the drone control device or a battery voltage level of the drone is less than or equal to a set level, and to stop the drone drive motor when a difference between the drone position and the ship position is less than or equal to a set distance.

The system for supporting a return home mode of a drone used on a ship in accordance with the embodiment may further include a communication unit installed in the drone and configured to provide an environment that allows for wireless communication with the drone remote control device.

The system for supporting a return home mode of a drone used on a ship in accordance with the embodiment may further include a drone motor drive unit installed in the drone and configured to receive the drone drive motor control signal from the control unit as input, be switched, and control operation of the drone drive motor.

To achieve the above object, a method for supporting a return home mode using a system for supporting a return home mode of a drone used on a ship in accordance with another embodiment of the present disclosure is characterized by including: receiving, by a drone control device, GPS reception signal strength information at a first GPS receiver built therein; determining, by the drone control device, whether the GPS reception signal strength is greater than or equal to a set strength; displaying drone takeoff feasibility information on a display unit of the drone control device if the GPS reception signal strength is greater than or equal to the set strength; determining, by a control unit installed in the drone, whether return home information is received from the drone control device after the drone takes off; receiving ship position information from the drone control device and receiving drone position information from a second GPS receiver installed in the drone, by the control unit, when the return home information is received; controlling, by the control unit, a drone drive motor by generating a drone drive motor control signal based on the ship position information and the drone position information; determining, by the control unit, whether a difference between the drone position and the ship position is less than or equal to a set distance; and stopping, by the control unit, the drone drive motor when the difference between the drone position and the ship position is less than or equal to the set distance.

The method for supporting a return home mode in accordance with said another embodiment may further include determining, by the control unit, whether a battery voltage level of the drone is less than or equal to a set level if the return home information is not received in the determining whether the return home information is received, and the method may proceed to the receiving the ship position information and the drone position information if the battery voltage level of the drone is less than or equal to the set level.

According to the system and method for supporting a return home mode of a drone used on a ship in accordance with the embodiments of the present disclosure, there is an excellent effect of being able to accurately return the drone to the charging station of an operating ship regardless of the movement of the ship, by having a configuration that the drone control device receives GPS reception signal strength information at the first GPS receiver built therein, drone takeoff feasibility information is displayed on the display unit of the drone control device if the GPS reception signal strength is greater than or equal to the set strength, the drone drive motor is controlled by generating a drone drive motor control signal based on the ship position information received from the drone control device and the drone position information received from the second GPS receiver installed in the drone when the control unit installed in the drone receives return home information from the drone control device after the drone takes off, and the control unit stops the drone drive motor when the difference between the drone position and the ship position is less than or equal to the set distance.

BRIEF DESCRIPTION OF THE DRAWINGS

FIG. 1 is a block diagram of a system for supporting a return home mode of a drone used on a ship in accordance with an embodiment of the present disclosure; and FIG. 2 is a flowchart showing a method for supporting a return home mode using a system for supporting a return home mode of a drone used on a ship in accordance with an embodiment of the present disclosure.

DETAILED DESCRIPTION

In describing embodiments of the present disclosure, if it is determined that a specific description of known technology related to the present disclosure may unnecessarily obscure the subject matter of the present disclosure, the detailed description will be omitted. The terms described below are terms defined in consideration of the functions in the present disclosure, and may vary depending on the intention, custom, or the like of the user or operator. Thus, the definition should be made based on the contents throughout the present specification. The terms used in the detailed description are merely for describing the embodiments of the present disclosure and should in no way be construed as limiting. Unless explicitly stated otherwise, expressions in singular forms shall include the meaning of plural forms. In the present description, expressions such as "including" or "comprising" are intended to indicate certain features, numbers, steps, operations, elements, some of these, or combinations thereof, and should not be construed to exclude the presence or possibility of one or more other features, numbers, steps, operations, elements, some of these, or combinations thereof, other than those described.

In each system shown in the drawings, elements in some cases may each have the same or different reference numerals, which may suggest that the elements represented may be different or similar. However, elements may have different implementations and operate with some or all of the systems shown or described herein. The various elements shown in the drawings may be the same or different. Which one is referred to as a first element and which is called a second element is arbitrary.

In the present specification, when one component is said to "transmit," "transfer," or "provide" data or signals to another component, it includes not only the one component transmitting data or signals directly to said another component but also the one component transmitting data or signals to said another component via at least one other component.

Hereinafter, embodiments of the present disclosure will be described in detail with reference to the drawings.

FIG. 1 is a block diagram of a system for supporting a return home mode of a drone used on a ship in accordance with an embodiment of the present disclosure.

The system for supporting a return home mode of a drone used on a ship in accordance with an embodiment of the present disclosure is configured such that a drone control device 100 disposed on an operating ship S returns a drone D to a charging station of the ship S while communicating wirelessly with the drone D, as shown in FIG. 1. The communication method between the drone D and the drone control device 100 may use, for example, CDMA, LTE, LTE-M, etc., and is not particularly limited as long as it is a wireless communication method.

The drone control device 100 has a first GPS receiver 110 that receives GPS signals from GPS satellites and generates drone position information, and a display unit 120 that displays drone takeoff feasibility information (various display information such as characters and symbols indicating that drone takeoff is possible).

The drone control device 100 receives GPS reception signal strength information at the first GPS receiver 110, and displays drone takeoff feasibility information on the display unit 120 if the GPS signal strength is greater than or equal to a set strength, thereby notifying the drone operator that the drone can take off. The reason that the drone takeoff feasibility information is displayed to thereby notify the drone operator of the drone takeoff feasibility state when the GPS reception strength is greater than or equal to the set strength in this way is to ensure that the drone D returns to the charging station of the ship S accurately. In other words, if the drone D is taken off under the condition that a return position of the drone D is accurately recognized (a condition where the GPS reception strength is greater than or equal to the set strength), the accuracy of the return home mode of the drone D can be increased.

A communication unit 210, a second GPS receiver 220, a control unit 230, and a drone motor drive unit 240 are installed in the drone D.

The communication unit 210 serves to provide an environment that allows for wireless communication with the drone control device 100.

The second GPS receiver 220 serves to receive GPS signals from GPS satellites, and generate and provide drone position information to the control unit 230.

The control unit 230 serves to make the drone D take off or return to the charging station of the ship S while communicating wirelessly with the drone control device 100.

The control unit 230 generates a drone drive motor control signal based on ship position information (provided by the drone control device 100) and drone position information (provided by the second GPS receiver 220) when it receives return home information from the drone control device 100 or when the battery B voltage level is less than or equal to a set level, and provides the generated drone drive motor control signal to the drone motor drive unit 240, thereby controlling the driving of the drone drive motor M. The control unit 230 calculates the difference between the drone D position and the ship S position by being continuously provided with drone position information and ship position information, and stops the drone drive motor M if the difference between the drone D position and the ship S position is less than or equal to a set distance (i.e., when the charging station of the ship has been reached).

The drone motor drive unit 240 serves to receive the drone drive motor control signal from the control unit 230 as input, to be switched, and to control the operation of the drone drive motor M.

In the following, a method for supporting a return home mode using a system for supporting a return home mode of a drone used on a ship in accordance with an embodiment of the present disclosure configured as described above will be described.

FIG. 2 is a flowchart showing a method for supporting a return home mode using a system for supporting a return home mode of a drone used on a ship in accordance with an embodiment of the present disclosure, where S represents a step.

First, the drone control device 100 receives GPS reception signal strength information at the first GPS receiver 110 built therein (S10).

Next, the drone control device 100 determines whether the GPS reception signal strength is greater than or equal to a set strength (S20).

Next, if the GPS reception signal strength is greater than or equal to the set strength in step S20 (Y), drone takeoff feasibility information is displayed on the display unit 120 of the drone control device 100 (S30), thereby notifying the drone operator of the drone takeoff feasibility.

Next, after the drone D takes off (S40), the control unit 230 determines whether return home information is received from the drone control device 100 (S50).

If the return home information is received in step S50 (Y), the control unit 230 receives ship position information from the drone control device 100 and receives drone position information from the second GPS receiver 220 (S60).

Next, the control unit 230 generates a drone drive motor control signal based on the ship position information and drone position information received in step S60, and controls the drone drive motor M by using the generated drone drive motor control signal (S70), thereby performing the return home mode of the drone D.

Next, the control unit 230 calculates the difference between the drone position and the ship position based on the received drone position information and ship position information, and determines whether the difference is less than or equal to a set distance (S80).

If the difference between the drone position and the ship position is less than or equal to the set distance in step S80 (Y), the control unit 230 stops the drone drive motor M (S90).

On the other hand, if the GPS reception signal strength is less than the set strength in step S20 (N), the process proceeds to step S10.

However, if the return home information is not received in step S50 (N), the control unit 230 determines whether the battery B voltage level of the drone D is less than or equal to a set level (S100).

If the battery voltage level of the drone D is less than or equal to the set level in step S100 (Y), the process proceeds to step S60.

On the other hand, if the difference between the drone position and the ship position is greater than the set distance in step S80 (N), the process proceeds to step S60.

According to the system and method for supporting a return home mode of a drone used on a ship in accordance with the embodiments of the present disclosure, it is possible to accurately return the drone to the charging station of an operating ship regardless of the movement of the ship, by having a configuration that the drone control device receives GPS reception signal strength information at the first GPS receiver built therein, drone takeoff feasibility information is displayed on the display unit of the drone control device if the GPS reception signal strength is greater than or equal to the set strength, the drone drive motor is controlled by generating a drone drive motor control signal based on the ship position information received from the drone control device and the drone position information received from the second GPS receiver installed in the drone when the control unit installed in the drone receives return home information from the drone control device after the drone takes off, and the control unit stops the drone drive motor when the difference between the drone position and the ship position is less than or equal to the set distance.

While optimal embodiments are disclosed in the drawings and specification and certain terms are used, these are merely used to describe the embodiments of the present disclosure, and are not used to limit the meaning or to restrict the scope of the present disclosure described in the claims. Thus, those having ordinary skill in the art will be able to understand that various modifications and other equivalent embodiments are possible therefrom. Therefore, the true scope of protection of the present disclosure should be determined by the technical ideas of the attached patent claims.

What is claimed is:

1. A system for supporting a return home mode of a drone used on a ship, in which a drone control device (100) disposed on an operating ship returns a drone (D) to a charging station of the ship while communicating wirelessly with the drone, wherein the drone control device is configured to display drone takeoff feasibility information on a display unit (120) in response to determining that a GPS signal strength received by a first GPS receiver (110) built therein is greater than or equal to a set strength before the drone takes off, and to provide return home information and ship position information to the drone after the drone takes off, and the drone takeoff feasibility information indicates that the drone is allowed to take off, the system for supporting a return home mode of a drone used on a ship comprising:

a second GPS receiver (220) installed in the drone and configured to generate drone position information by receiving GPS signals from GPS satellites; and a control unit (230) installed in the drone, and configured to control a drone drive motor (M) by generating a drone drive motor control signal based on the ship position information and the drone position information when the return home information is received from the drone control device or a battery (B) voltage level of the drone is less than or equal to a set level, and to stop the drone drive motor when a difference between the drone position and the ship position is less than or equal to a set distance.

2. The system for supporting a return home mode of a drone used on a ship of claim 1, further comprising:

a communication unit (210) installed in the drone (D) and configured to provide an environment that allows for wireless communication with the drone control device (100).

3. The system for supporting a return home mode of a drone used on a ship of claim 1, further comprising:

a drone motor drive unit (240) installed in the drone and configured to receive the drone drive motor control signal from the control unit (230) as input, be switched, and control operation of the drone drive motor (M).

4. A method for supporting a return home mode using a system for supporting a return home mode of a drone used on a ship, comprising:

receiving, by a drone control device (100), GPS reception signal strength information at a first GPS receiver (110) built therein;

determining, by the drone control device, whether the GPS reception signal strength is greater than or equal to a set strength before the drone takes off;

displaying drone takeoff feasibility information on a display unit (120) of the drone control device in response to determining that the GPS reception signal strength is greater than or equal to the set strength, the drone takeoff feasibility information indicating that the drone is allowed to take off;

determining, by a control unit (230) installed in the drone, whether return home information is received from the drone control device after the drone takes off;

receiving ship position information from the drone control device and receiving drone position information from a second GPS receiver (220) installed in the drone, by the control unit, when the return home information is received;

controlling, by the control unit, a drone drive motor (M) by generating a drone drive motor control signal based on the ship position information and the drone position information;

determining, by the control unit, whether a difference between the drone position and the ship position is less than or equal to a set distance; and stopping, by the control unit, the drone drive motor when the difference between the drone position and the ship position is less than or equal to the set distance.

5. The method of claim 4, further comprising:

determining, by the control unit (230), whether a battery (B) voltage level of the drone is less than or equal to a set level in response to determining that the return home information is not received, wherein the method proceeds to the receiving the ship position information and the drone position information in response to determining that the battery voltage level of the drone is less than or equal to the set level.

\* \* \* \* \*